US012591369B2

(12) United States Patent
Thakare et al.

(10) Patent No.: US 12,591,369 B2
(45) Date of Patent: Mar. 31, 2026

(54) NODE CACHE MIGRATION

(71) Applicant: Salesforce, Inc., San Francisco, CA (US)

(72) Inventors: Shrikant Thakare, Burlington, MA (US); Maxence Weyrich, San Francisco, CA (US); Shivakarthik Subramanyam, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 150 days.

(21) Appl. No.: 18/055,615

(22) Filed: Nov. 15, 2022

(65) Prior Publication Data

US 2024/0160354 A1     May 16, 2024

(51) Int. Cl.
*G06F 3/06* (2006.01)

(52) U.S. Cl.
CPC .......... *G06F 3/0617* (2013.01); *G06F 3/0647* (2013.01); *G06F 3/067* (2013.01)

(58) Field of Classification Search
CPC ....... G06F 3/0617; G06F 3/0647; G06F 3/067
See application file for complete search history.

(56) References Cited

U.S. PATENT DOCUMENTS

| | | | |
|---|---|---|---|
| 7,055,149 B2 | 5/2006 | Birkholz et al. | |
| 2005/0267951 A1 | 12/2005 | Joshi et al. | |
| 2006/0218545 A1 | 9/2006 | Taguchi | |
| 2011/0126197 A1* | 5/2011 | Larsen | G06F 21/31 |
| | | | 718/1 |

| | | | |
|---|---|---|---|
| 2012/0159473 A1* | 6/2012 | Tsirkin | G06F 9/4856 |
| | | | 718/1 |
| 2013/0031550 A1* | 1/2013 | Choudhury | G06F 9/5033 |
| | | | 718/1 |
| 2013/0326175 A1* | 12/2013 | Tsirkin | G06F 9/45558 |
| | | | 711/E12.103 |
| 2015/0324215 A1* | 11/2015 | Borthakur | G06F 9/45558 |
| | | | 718/1 |
| 2016/0335106 A1* | 11/2016 | Behere | G06F 9/45558 |
| 2017/0171029 A1* | 6/2017 | Maknojia | G06F 8/658 |

(Continued)

OTHER PUBLICATIONS

Awati, Rahul; Definition: Live Migration; 2025; TechTarget Network; https://www.techtarget.com/searchitoperations/definition/live-migration. (Year: 2025).*

*Primary Examiner* — Eric T Loonan

(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to upgrading nodes. A computer system may detect that there is an update to a node image used to deploy a set of nodes managed by the computer system. The computer system may select, for an upgrade process, a first node from the set of nodes that includes a first volume used to store data of applications executing on that first node. The computer system may upgrade the first node by deploying a second node running the updated node image, transition the first node to a read-only mode in which read transactions but not write transactions are routed to the applications, and copy particular data from the first volume of the first node to a second volume of the second node. The computer system may, after completion of the copy operation, evict the applications from the first node and redeploy them on the second node.

19 Claims, 9 Drawing Sheets

(56)                    References Cited

U.S. PATENT DOCUMENTS

| | | | | |
|---|---|---|---|---|
| 2017/0177401 | A1* | 6/2017 | Brouwer | G06F 9/5077 |
| 2017/0199770 | A1* | 7/2017 | Peteva | G06F 9/5088 |
| 2018/0091591 | A1* | 3/2018 | Puri | H04L 67/1031 |
| 2018/0373553 | A1* | 12/2018 | Connor | G06F 9/45558 |
| 2019/0179658 | A1* | 6/2019 | Jones | G06F 16/214 |
| 2021/0255846 | A1* | 8/2021 | Mamgain | H04L 67/34 |

* cited by examiner

Upgrade Store
170

| Node Mapping 200 | | |
|---|---|---|
| Old Node | New Node | State 220 |
| Private DNS 210A | Private DNS 210D | Failed (3) — Failure Count 230 |
| Private DNS 210B | Private DNS 210E | In-Progress |
| Private DNS 210C | Private DNS 210F | Complete |
| ⋮ | ⋮ | ⋮ |

*FIG. 2*

Node Image Upgrade Process
400

Wait For Trigger Event
402

Pick Any Node With An Old Image
404

Create New Node
405

Is New Node With New Image Up?
406 — No

Yes

Set Old Node to Read-Only Mode
408

Begin Copy of Data to New Node
410

Is Copy Complete?
412 — No

Yes

Evict Pods From Old Node And Scale Node Down
414

Schedule Pods on New Node
416

Is There Another Node to Process?
418 — Yes

No

NODE CACHE MIGRATION

BACKGROUND

Technical Field

This disclosure relates generally to computer systems and, more specifically, to various mechanisms for upgrading computing nodes.

Description of the Related Art

Cloud infrastructure typically includes hardware and software computing resources via which applications can execute that communicate with end users. For example, an application may execute in a virtual environment hosted on server-based hardware included in a datacenter of a cloud provider. Updates to the cloud infrastructure or the software deployed by tenants to that cloud infrastructure are often developed over time. As an example, a new virtual machine (VM) image that can be used to instantiate a VM onto the cloud infrastructure might be created by a VM developer. In many cases, multiple software resources (e.g., VMs) utilize the same version of software (e.g., the same server image) and thus an update to the software can involve updating more than one software resource. Moreover, the software resources may be expected to continue to interact with end users and other entities even when an upgrade to those software resources is planned.

BRIEF DESCRIPTION OF THE DRAWINGS

FIG. 2 is a block diagram illustrating example elements of an upgrade store that includes a node mapping for facilitating node upgrade processes, according to some embodiments.

DETAILED DESCRIPTION

Figure 1:
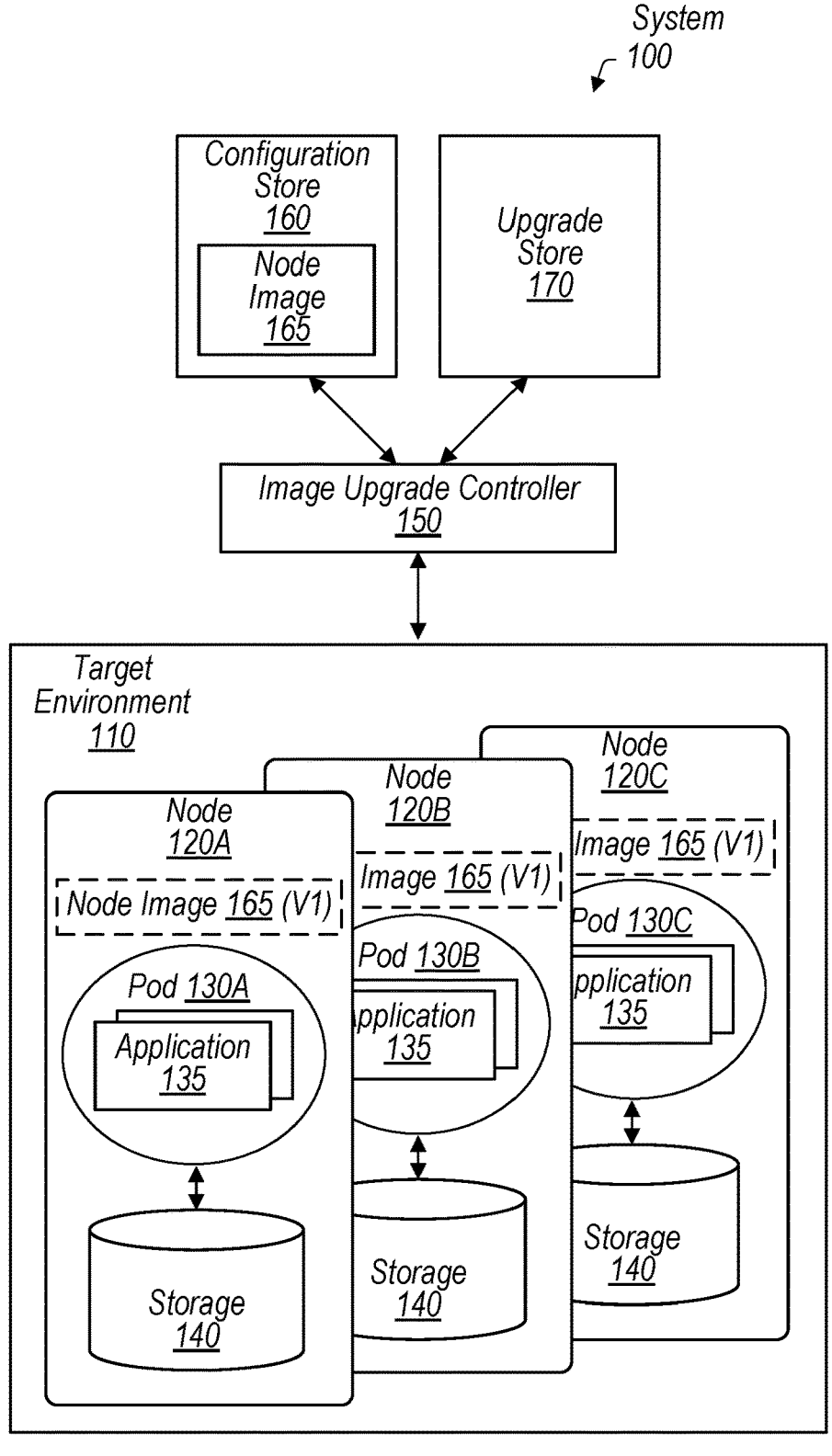
FIG. 1 is a block diagram illustrating example elements of a system that includes a node image upgrade controller capable of upgrading nodes, according to some embodiments.

In many cases, companies are now shifting from deploying their applications on a local infrastructure to deploying them on a cloud infrastructure that is provided by a cloud provider, such as Amazon™. Nodes (e.g., VMs), storage volumes, and other cloud resources are usually provisioned to enable the deployment and execution of applications. A node can be provisioned on the cloud infrastructure using a node image that includes all the information that is required to launch the node. When an update is released for a node image that was used to deploy nodes, it is often desirable to upgrade those nodes using the updated node image as the updated version can include fixes to vulnerabilities and software bugs. But one type of application that may be deployed onto a node is a storage application that utilizes a storage volume coupled to the node for storing data. The data stored in that storage volume, however, is ephemeral since it is wiped on a node reboot or a node upgrade. Consequently, when a node upgrade occurs, that storage application loses access to data that is relied on by the storage application for its operation. As a result, various service requirements, such as high availability of user data, can be difficult for the storage application to meet. Moreover, that storage application may be one of many storage applications that collectively implement a storage service. Each of the storage applications may execute on a respective node and thus many nodes may be used in implementing that storage service. The negative effects of upgrading nodes are compounded for the storage service when there are many nodes that have to be upgraded. The present disclosure addresses, among other things, the problem of how to carry out a node upgrade that preserves the data of an application and also reduces the downtime for that application.

In various embodiments that are described below, a computer system manages a set of nodes deployed to an environment using a node image. During operation, the computer system may detect that an updated node image has been created that is an update to the previous node image used in deploying the set of nodes. In various embodiments, in response to detecting the updated node image, the computer system performs a node image upgrade process for the set of nodes. Consequently, the computer system may select a first node from the set of nodes for which to perform that node image upgrade process. That first node may include or be coupled to a storage volume/disk that is used to store data for a set of applications executing on the first node. As a part of performing the upgrade process for the first node, in various embodiments, the computer system deploys, based on the updated node image, a second node having a storage volume to the environment. The computer system may then perform a copy operation to copy particular data (e.g., user data) from the storage volume of the first node to the storage volume of the second node. In various embodiments, the computer system further transitions the first node to a read-only mode in which the first node processes certain database transactions that involve read operations but not write operations. Accordingly, the computer system may route write traffic to other nodes that are not operating in a read-only mode, ensuring that users still have access to certain computing resources as the upgrade is running. After completion of the copy operation, the computer system may evict the set of applications from the first node and then deploy them on the second node. The computer system may then route write traffic to the second node, and the set of applications may service that write traffic using the data copied to the second node from the first node.

These techniques may be advantageous over prior approaches as these techniques allow for a node to be upgraded without losing particular data stored at the node that may be relevant to the operation of an application, such as storage server. In particular, by spinning up another node and copying the particular data from the old node to the new node before deallocating the old node, the particular data can be preserved. By preserving the particular data, the computer system may ensure that the upgrade process is implemented without loss of that particular data and enable the redeployed applications to resume execution quicker than if they had to recreate the particular data at the new node. Furthermore, by transitioning the old node into a read-only mode instead of stopping all operations on that node, the old node can continue to process work and thus continue to service clients with minimal or zero downtime. Also, as discussed in more detail below, the computer system may perform multiple upgrade processes in parallel and thus upgrade the set of nodes more quickly. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a target environment 110, an image upgrade controller 150, a configuration store 160, and an upgrade store 170. As further depicted, target environment 110 includes nodes 120A-C, each having a respective pod 130 (with a set of applications 135) and a storage 140, and configuration store 160 includes a node image 165. In some embodiments, system 100 is implemented differently than shown—e.g., configuration store 160 and upgrade store 170 may be combined into a single store, image upgrade controller 150 may interact with a deployment system (e.g., Kubernetes™) to deploy nodes 120 into target environment 110, etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Consequently, nodes 120, image upgrade controller 150, configuration store 160, and upgrade store 170 may execute on and use the available cloud resources of the cloud infrastructure (e.g., computing resources, storage resources, network resources, etc.) to facilitate their operations. As an example, image upgrade controller 150 may execute in a virtual environment hosted on server-based hardware included within a datacenter. But in some embodiments, system 100 is implemented utilizing a local or private infrastructure as opposed to a public cloud.

Target environment 110, in various embodiments, is a collection of resources available for implementing services (e.g., a database service, a storage service, etc.). The resources may include hardware (e.g., CPUs, GPUs, disks, etc.), software routines (e.g., VMs, firewalls, etc.), or a combination thereof. In some embodiments, target environment 110 corresponds to a cloud infrastructure (e.g., Amazon Web Services™) provided by a cloud provider and made available to one or more tenants (e.g., government agencies, companies, individual users, etc.). For cases in which there are multiple tenants using target environment 110, target environment 110 may provide isolation such that the data of one tenant is not exposed (without authorization) to other tenants. In some embodiments, target environment 110 corresponds to the particular resources of a cloud infrastructure that is being used by a particular tenant—target environment 110 may also be implemented using a private infrastructure. As shown, nodes 120A-C execute in target environment 110 and utilize its resources (e.g., storage 140) to facilitate their operations.

A node 120, in various embodiments, is a VM that has been deployed onto the resources of target environment 110. A node 120 can be deployed using a node image 165. A node image 165, in various embodiments, is a template having a software configuration (which can include an operating system) that can be used to deploy an instance of a VM. Amazon Machine Image (AMI) is one example of a node image 165. AMI can include snapshots (or a template for the root volume of the instance (e.g., an operating system)), launch permissions, and a block device mapping that specifies the volume(s) (e.g., a storage 140) to attach to that instance when it has been launched. In various embodiments, the software executing on one node 120 may interact with the software that is executing on another node 120. For example, a process executing on node 120A might communicate with a process executing on another node 120 to transfer data from the storage 140 of node 120A to the storage 140 of that other node 120. Once a node 120 has been deployed, pods 130 having applications 135 (and potentially other software routines) may be deployed onto that node 120. In some embodiments, a node 120 is a physical machine that has been deployed to target environment 110.

A pod 130, in various embodiments, is a group of containerized applications 135, with shared resources, and a specification for executing the containerized applications. For example, a pod 130 may include a container with a Node.js application 135 and a container with another application 135 that feeds data to the Node.js application 135. Pods 130 may be deployed by a large-scale deployment service, such as Kubernetes. Once a node 120 has been deployed and become an available resource to Kubernetes, it may deploy a requested pod 130 onto that node 120. Deploying a pod 130 onto a given node 120 may involve Kubernetes communicating with an agent residing on that node 120, where the agent triggers the execution of the containerized applications 135 in that pod 130—Kubernetes may use a control plane that can automatically handle the scheduling of pods across the nodes 120 of a cluster included in target environment 110. In various embodiments, a node 120 can support multiple pods 130, and thus Kubernetes may deploy multiple pods 130 onto a single node 120. While pods 130 are discussed, in some embodiments, applications 135 can be installed on a node 120 and executed without the use of containerization.

A storage 140, in various embodiments, is a storage disk/volume that is made available to applications 135 executing on a node 120 for storing their application data. A storage 140 may correspond to any suitable form of network storage, such as a network attached storage (NAS), storage area network (SAN), etc. In some embodiments, a storage 140 may be a solid-state drive cache volume or any other form of volatile or non-volatile physical storage volume. Access to a storage 140 may also be modified by a provider of target environment 110, a node 120, a pod 130, or an application 135, by for example granting read/write/execute permissions to the users of a given node 120.

Image upgrade controller 150, in various embodiments, is software that is executable to manage tasks related to upgrading nodes 120, including upgrading nodes 120 to a new node image 165 and migrating data between the storages 140 of different nodes 120. Image upgrade controller 150 may be a stateless process that runs separately (e.g., on its own cluster of nodes) and independently of nodes 120.

While image upgrade controller 150 is shown separately from target environment 110, in some embodiments, image upgrade controller 150 executes on a set of resources (e.g., one or more nodes 120) of target environment 110. To facilitate its operation, image upgrade controller 150 is connected to configuration store 160 and upgrade store 170 so that it can access and maintain that is data relevant to upgrading a node 120. As discussed in more detail with respect to FIGS. 3A-C, image upgrade controller 150 may detect the presence of a new node image 165 at configuration store 160 and then proceed to upgrade a set of nodes 120 by causing a new set of nodes 120 to be deployed based on the new node image 165 and then moving elements (e.g., a pod 130) from the old set of nodes 120 to the new set of nodes 120.

Configuration store 160, in various embodiments, is a storage repository that is used to store, among other things, node images 165 and metadata pertaining to those node images 165, such as image version numbers. Configuration store 160 may be a local repository that resides on the same network as image upgrade controller 150, or it might be a remote repository (e.g., GitHub©) that is external the controller's network. When a new node image 165 is published, node configuration metadata (e.g., a specification that describes parameters for deploying and configuring a node 120, such as which node image 165 should be used) is updated and persisted in configuration store 160. That information is accessible to image upgrade controller 150 and updates to that information may be used to trigger image upgrade controller 150 to update one or more nodes 120, as discussed in more detail with respect to FIG. 3A-C.

Upgrade store 170, in various embodiments, is a storage repository that is used to store, among other things, information relating to upgrade processes that are being handled by image upgrade controller 150. Upgrade store 170 may be a distributed key-value database that stores a pod-to-node mapping, a node-to-node mapping, or a mapping that is a combination of those two mappings. In various embodiments, the mapping(s) maintained at upgrade store 170 allow for image upgrade controller 150 to ensure that a pod 130 is scheduled on the node 120 having the data expected by that pod 130. That is, each pod 130 may expect certain data to be present in a node's storage 140. When cached data is copied from an old node 120 to a new node 120, the metadata (e.g., a mapping) from upgrade store 170 may be used to ensure that the pod 130 running on the old node is rescheduled on the new node 120. An example mapping is discussed with respect to FIG. 2.

Turning now to FIG. 2, a block diagram of an example node mapping 200 is shown. In the illustrated embodiment, upgrade store 170 includes node mapping 200. As further shown, node mapping 200 specifies private Domain Name System (DNS) addresses 210A-F and state values 220. In some embodiments, node mapping 200 is implemented differently than shown. For example, instead of DNS addresses 210, node mapping 200 might identify application IDs, pod IDs, or node IDs assigned to the associated nodes 120. As another example, node mapping 200 might identify multiple private DNS addresses 210 corresponding to multiple pods 130 executing on a particular node 120.

Node mapping 200, in various embodiments, is information that is maintained by image upgrade controller 150 to track the progress of an upgrade process being performed for a given node 120. Accordingly, when a node 120 has been selected and a new node 120 has been spun-up, image upgrade controller 150 may add a new entry to node mapping 200 that identifies the private DNS address 210 of the selected node 120 (or a pod 130 executing on the selected node 120) under the old node section and the private DNS address 210 of the new node 120 under the new node section. As mentioned, upgrade store 170 may be a key-value store. Accordingly, in various embodiments, the private DNS address 210 associated with the old node 120 is used as a key for accessing both the private DNS address 210 of the new node 120 and the state 220 of the corresponding upgrade process—in some cases, the private DNS address 210 of the new node 120 is used as the key for accessing node mapping 200. Once image upgrade controller 150 has created an entry for an upgrade process, it may then initiate a transfer of data between the old node 120 and the new node 120 corresponding to that upgrade process and record the state of that transfer under state 220. In some embodiments, the transfer is facilitated using the mapping between private DNS addresses 210. If a transfer fails, image upgrade controller 150 may reattempt the transfer and use node mapping 200 to determine which nodes 120 (and pods 130) are involved. Once an old node 120 has been deallocated, in various embodiments, image upgrade controller 150 removes its entry from node mapping 200. But in some embodiments, image upgrade controller 150 waits until all relevant nodes 120 have been upgraded and then deletes the entire node mapping 200.

State 220, in various embodiments, describes the state of a node image upgrade process for a node 120. For example, as depicted, the state 220 of the node image upgrade process that involves the node 120 associated with private DNS address 210B is "in-progress." In various embodiments, in-progress indicates that the data transfer from an old node 120 to a new node 120 is not yet complete. Thus, the data transfer from the node 120 associated with private DNS address 210B to the new node 120 associated with private DNS address 210E is not complete. In some embodiments, if the node image upgrade process between an old node 120 and a new node 120 fails, then the process is retried. The number of failures is recorded as a failure count 230 under the state 220 associated with the new and old nodes 120. As shown for example, the state 220 of the process corresponding to the nodes 120 associated with DNS addresses 210A and 210B is "failed" with a count of 3. In various embodiments, image upgrade controller 150 reattempts the node image upgrade process (or the failed portion (e.g., the data transfer)) up to a threshold failure count (e.g., five times). If threshold failure count is reached, image upgrade controller 150 may notify a user (e.g., an administrator) so that the user can resolve the is sue(s) preventing the node image upgrade process from completing. Metadata may also be maintained at upgrade store 170 that enables a data transfer to be resumed from the near or at the point in time where it failed, which may avoid re-running the entire data transfer. Once the upgrade process for a node 120 has completed, image upgrade controller 150 may update the associated state 220 in node mapping 200 to "complete."

Figure 3A:
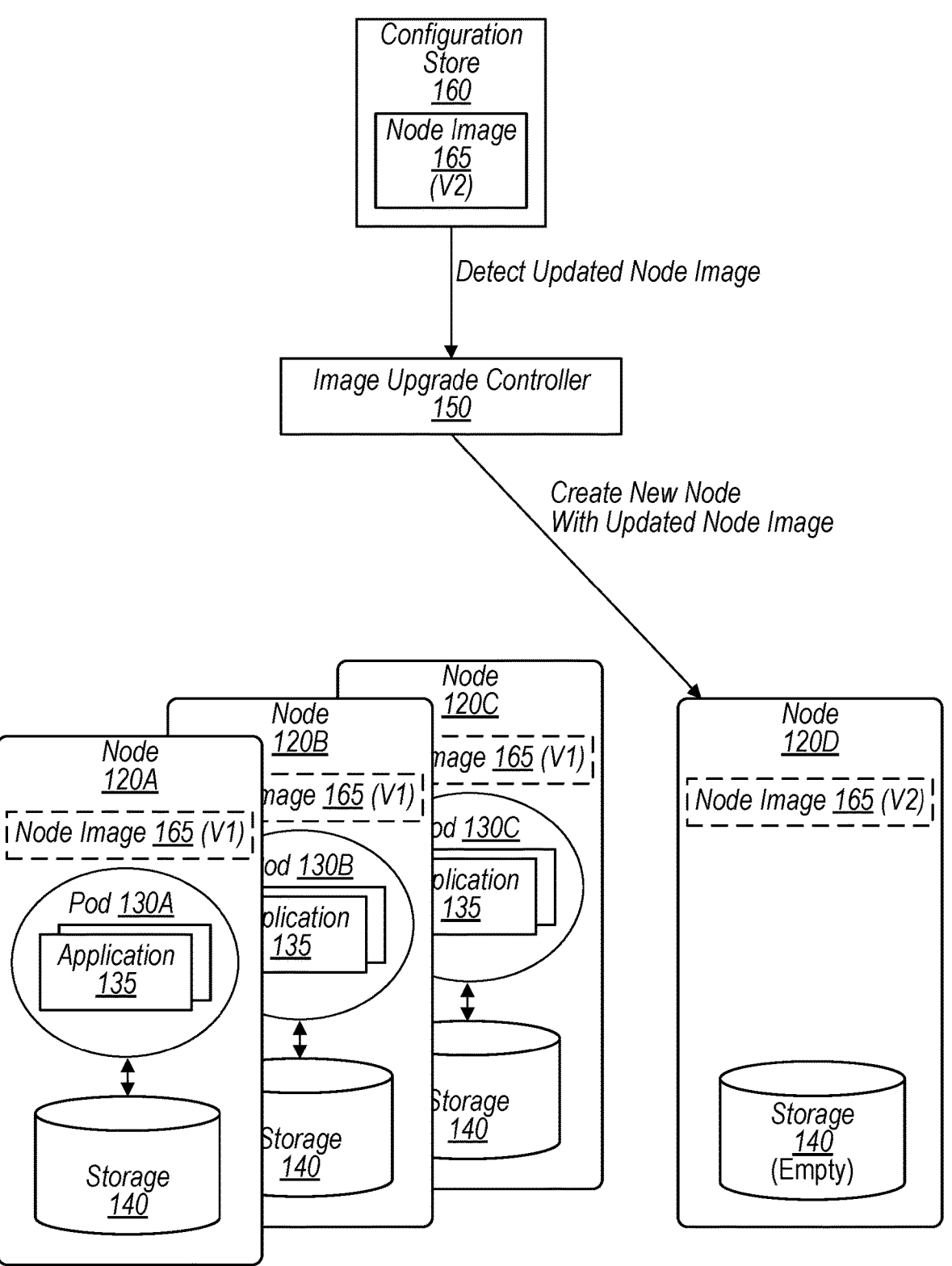
FIGS. 3A-C are block diagrams illustrating an example node upgrade process performed for a set of nodes, according to some embodiments.

Turning now to FIG. 3A, a block diagram of the beginning of an image upgrade process for a node 120 is shown. In the illustrated embodiment, there is a set of nodes 120A-D, image upgrade controller 150, and configuration store 160. As further shown, nodes 120A-C include respective pods 130A-C (with applications 135) and storages 140, and configuration store 160 includes a node image 165. Also as shown, nodes 120A-C have been deployed based on a node image 165 having a version (V1). The illustrated embodiment may be implemented differently than shown. For example, nodes 120A may execute applications 135 that are not contained in pods 130.

Over time, new versions of a node image 165 may be developed and then published to configuration store 160 (e.g., by uploading the new node image 165 or storing a link to the new node image 165). In the illustrated embodiment, a node image 165 with a version (V2) is stored at configuration store 160. In some embodiments, upon a new node image 165 being published, image upgrade controller 150 may receive an indication from configuration store 160 or a user about the new node image 165. In other embodiments, image upgrade controller 150 may poll configuration store 160 periodically and detect that the node image version of the node image 165 stored at configuration store 160 is different than the node image version of the nodes 120 that are managed by image upgrade controller 150. As shown for example, nodes 120A-C are associated with a node image 165 (V1) while configuration store 160 stores a new node image 165 (V2).

Upon detecting the version drift, image upgrade controller 150 may start upgrading the nodes 120 under its control. In various embodiments, image upgrade controller 150 selects one of the nodes 120 based on a selection scheme (e.g., round robin, by application workload, etc.). In the illustrated embodiment, image upgrade controller 150 selects node 120A. After selecting node 120A, image upgrade controller 150 may then proceed to cause the new node 120D to be allocated based on node image 165 (V2), with node 120D including an empty storage 140. In order to allocate node 120D, in various embodiments, image upgrade controller 150 interfaces with a deployment system (e.g., Kubernetes) to deploy node 120D (e.g., by providing the new node image 165 to that deployment system and instructing it to deploy the new node 120). In some embodiments, image upgrade controller 150 deploys node 120D without the assistance of a deployment system as it may control the allocation of resources to target environment 110. After node 120D has been allocated, image upgrade controller 150 may update node mapping 200 at upgrade store 170 with the private DNS addresses 210 of nodes 120A and 120B and set the appropriate state 220 to "In-Progress".

Figure 3B:
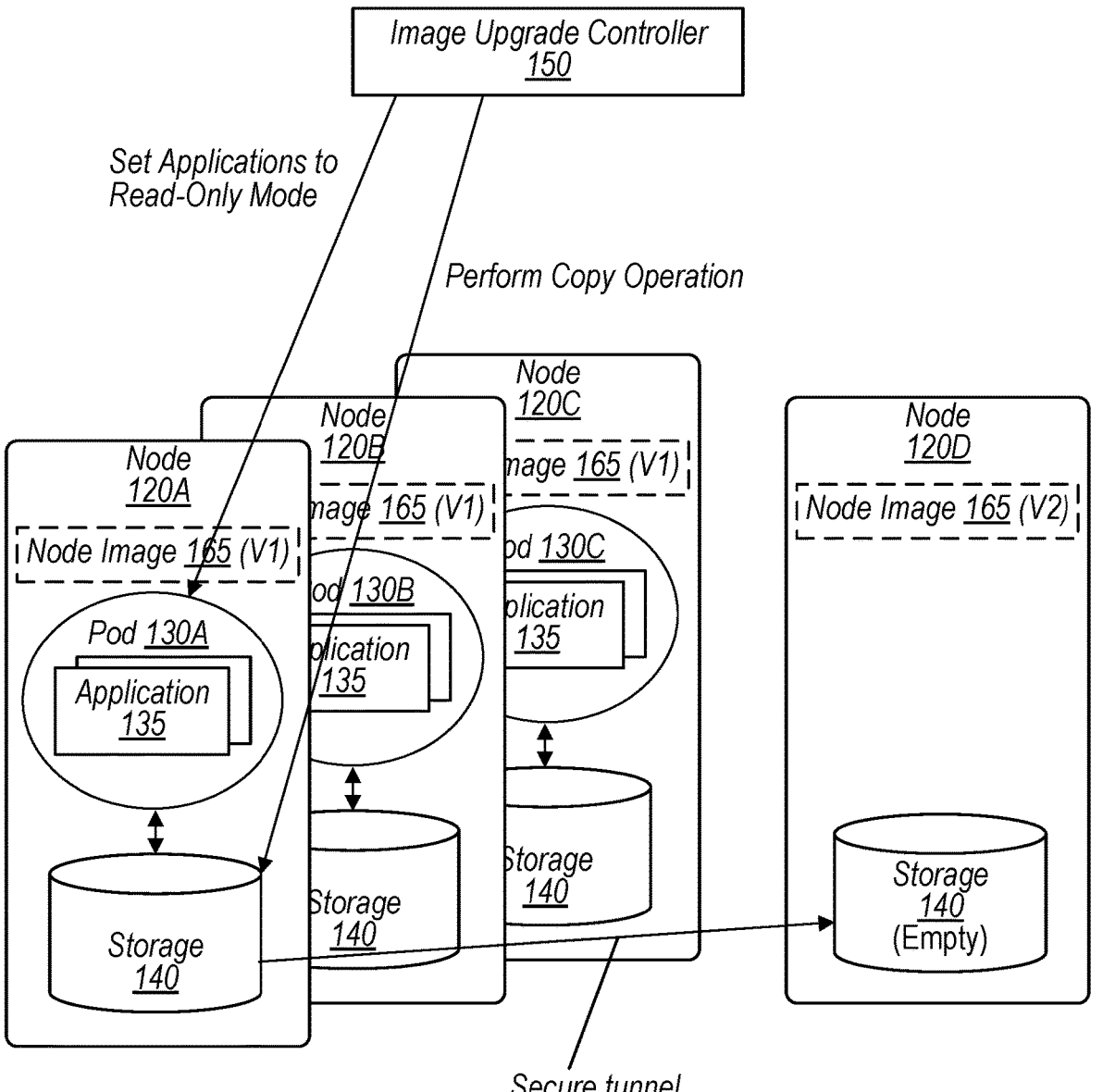

Turning now to FIG. 3B, a block diagram of a continuation of the image upgrade process discussed with respect to FIG. 3A is shown. In the illustrated embodiment, there is nodes 120A-D and image upgrade controller 150. As further shown, nodes 120A-C include respective pods 130A-C (with applications 135) and storages 140, and node 120D includes no pod 130 and an empty storage 140. Also as shown, nodes 125A-C have been deployed based on a node image 165 having a version (V1) and node 120D has been deployed based on a new node image 165 having a newer version (V2). The illustrated embodiment may be implemented differently than shown—e.g., nodes 120 may execute applications 135 that are not contained in pods 130.

As part of the upgrade process for a node 120, in various embodiments, image upgrade controller 150 sets the pod(s) 130 (or one or more applications 135 in those pods 130) executing on that node 120 to a read-only mode. The pod(s) 130 (or one or more applications 135 in those pods 130) may continue to service read traffic while in that read-only mode. By continuing to service read traffic, a node 120 may reduce a portion of the workload that would otherwise be placed on another node 120. Write traffic may be routed to other nodes 120 that are executing the same or similar pods 130 to the node 120 being upgraded. For example, pod 130A may be transitioned into the read-only mode and then write traffic directed at pod 130A may be routed to pod 130B and/or 130C. The write traffic may be routed to prevent a node 120 from updating its storage 140 while a cache migration operation is being performed on that storage 140.

After transitioning a node 120 into the read-only mode, in various embodiments, image upgrade controller 150 performs the cache migration operation for that node 120. To perform the cache migration operation, image upgrade controller 150 may cause a computer process to be instantiated on the new node 120 (e.g., node 120D) that issues data requests to the old node 120 (e.g., node 120A) for at least a portion of the data stored in its storage 140. The data may be returned to the computer process and stored at the storage 140 of the new node 120. In some embodiments, data is pushed to the new node 120 instead of being pulled via requests from the new node 120 to the old node 120—that is, a process on the old node 120 sends data without receiving requests from a process on the new node 120.

In various embodiments, a secure data transfer mechanism is used to transfer data from the storage 140 of the old node 120 to the storage 140 of the new node 120. In particular, the data transfer may utilize a Mutual Transport Layer Security (mTLS) mechanism that leverages dynamically provisioned security certificates on the nodes 120 involved in the transfer. Those nodes 120 may each execute a containerized application that generates security certificates for its node 120 and periodically updates those security certificates at regular cadence for an extra layer of security. Consequently, security certificates on the old node 120 and the new node 120 may be used to establish a secure tunnel between the nodes 120, whereby data is secured using cryptographic keys associated with the security certificates.

As data is transferred or at the end of the data transfer, in some embodiments, the new node 120 dynamically validates that the data was copied correctly using cryptographic hashes of the data. In particular, a process executing on the new node 120 may generate hash values on the data copied to the storage 140 of the new node 120 and compare the hash values to hash values supplied by a process executing on the old node 120. If there exists a difference between one or more of the hash values, then the new node 120 may re-request the data associated with the hash values that are different.

Figure 3C:
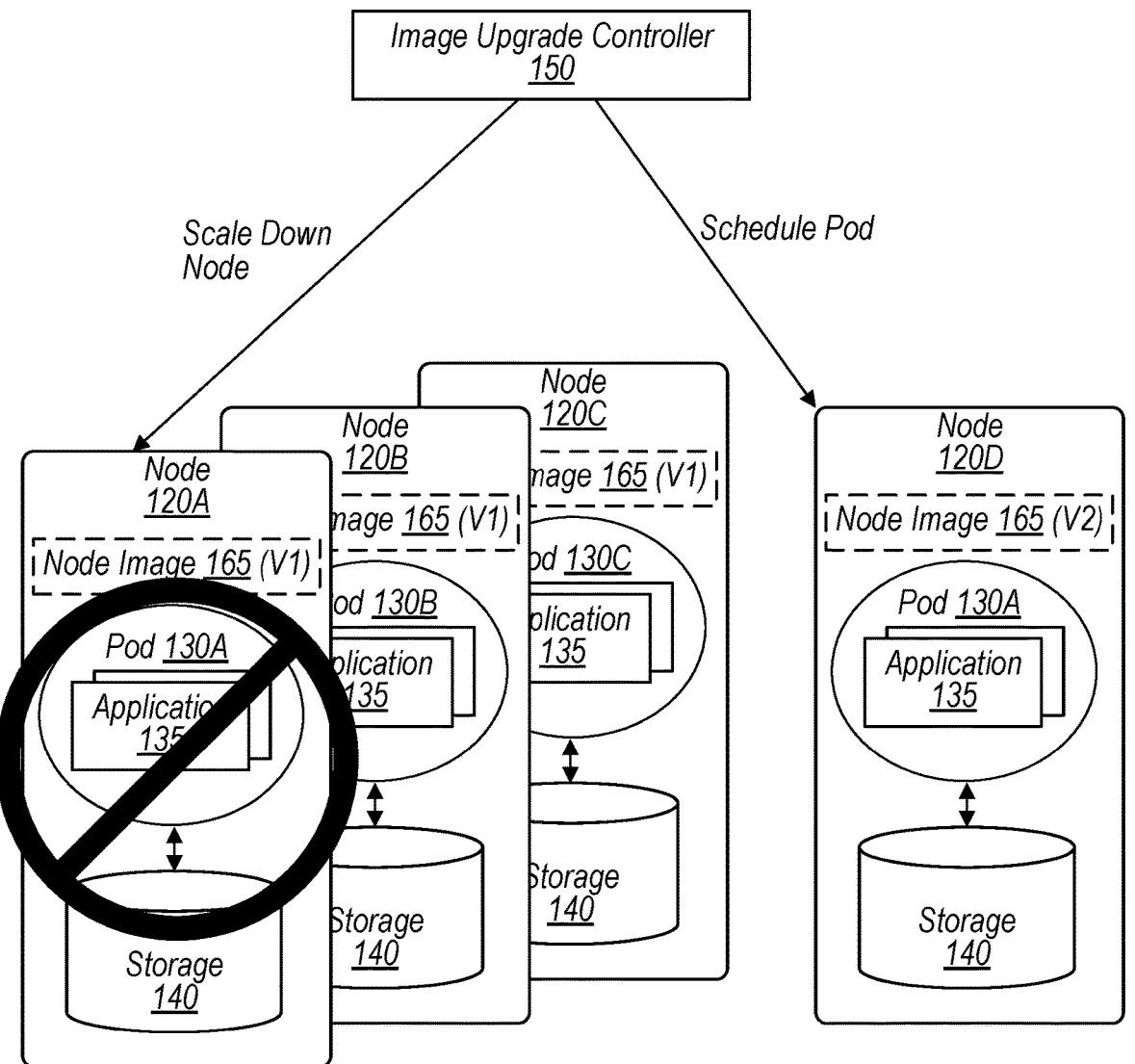

Turning now to FIG. 3C, a block diagram of a continuation of the image upgrade process discussed with respect to FIG. 3B is shown. In the illustrated embodiment, there are nodes 120A-D and image upgrade controller 150. Also as shown, nodes 125A-C have been deployed based on a node image 165 having a version (V1) and node 120D has been deployed based on a new node image 165 having a newer version (V2). The illustrated embodiment may be implemented differently than shown—e.g., nodes 120 may execute non-containerized applications 135.

In various embodiments, after the data transfer from the old node 120 (e.g., node 120A) to the new node 120 (e.g., node 120D) has finished, image upgrade controller 150 reschedules the pod(s) 130 corresponding to the old node 120 (e.g., pod 130A) such that they are removed from the old node 120 and deployed onto the new node 120. As shown for example, pod 130A is rescheduled onto node 120D from node 120A. After a pod 130 has been rescheduled, image upgrade controller 150 may transition the pod 130 from the read-only mode to a write mode in which applications 135 of the pod 130 process write traffic—system 100 may start routing new write traffic to the pod 130. After image upgrade controller 150 completes the transfer and the new node 120 is fully operational, the old node 120 is scaled down and removed from the node cluster. As shown for example, node 120A is removed. Image upgrade controller 120 may then update the relevant state 220 in node mapping 200 to "Complete". Thereafter, image upgrade controller 150 may start the same upgrade process for another node 120.

Figure 4:
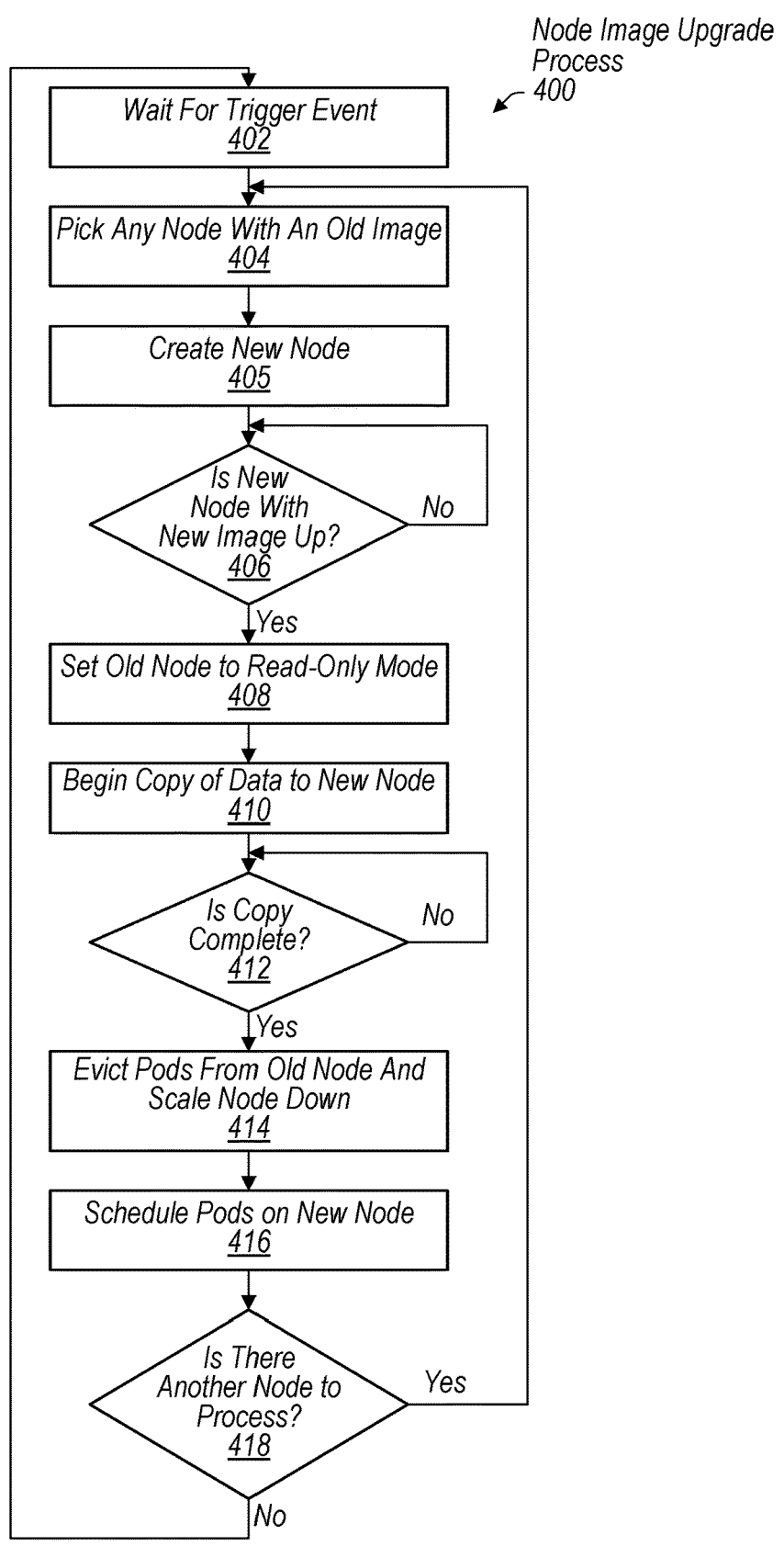
FIG. 4 is a flow diagram illustrating an example node upgrade process performed for a set of nodes, according to some embodiments.

Turning now to FIG. 4, a flowchart illustrating an example node image upgrade process 400 is shown. In the illustrated embodiment, node image upgrade process 400 includes a series of steps 402-418. Process 400 may be implemented by image upgrade controller 150. In some embodiments, process 400 is implemented differently than shown. For example, process 400 may include an additional step in which communicates with a deployment system.

At step 402, image upgrade controller 150 waits for a trigger event that indicates that a node image upgrade should be performed for nodes 120 managed by image upgrade controller 150. In various embodiments, the trigger event is a detection that there is a difference between the image version of the nodes 120 and the image version at configuration store 160. In some cases, configuration store 160 generates an indication of a new node image 165 and sends that indication to image upgrade controller 150 (e.g., responsive to the storage of a new node image 165). Once the trigger event occurs, the image upgrade controller 150 proceeds to step 404. At step 404, image upgrade controller 150 selects a node 120 with an old node image from a list of nodes, which may be present at upgrade store 170. Once a node 120 has been selected, image upgrade controller 150 then proceeds to step 405 in which it communicates with a deployment system to create/deploy a new node 120 and thereafter proceeds to step 406.

At step 406, image upgrade controller 150 determines whether a new node 120 running the new node image 165 has been spun up. If image upgrade controller 150 determines that the node 120 has not been spun up, then it may communicate with a deployment system to check the status of a previous request to deploy that new node 120. If image upgrade controller 150 determines (e.g., based on a list maintained at upgrade store 170) that the new node 120 is available, then image upgrade controller 150 proceeds to step 408. At step 408, image upgrade controller 150 sets the old node 120 to the read-only mode (e.g., image upgrade controller 150 sets applications 135 to read-only mode as illustrated in FIG. 3B). Once the old node 120 has been set to the read-only mode, image upgrade controller 150 proceeds to step 410. At step 410, image upgrade controller 150 begins copying data from the old node 120 to the new node 120 (e.g., image upgrade controller 150 causes data to be transferred from the storage 140 of old node 120A to the storage 140 of the new node 120D via a secure tunnel as illustrated in FIG. 3B). At step 412, image upgrade controller 150 continues to check whether the copying is complete and after image upgrade controller 150 determines that the copying is complete, it proceeds to step 414.

At step 414, image upgrade controller 150 evicts the set of pods 130 from the old node 120 and then scales the node down (e.g., image upgrade controller 150 evicts and scales down node 120A running old node image as illustrated in FIG. 3C). Image upgrade controller 150 then proceeds to step 416. At step 416, image upgrade controller 150 schedules the set of pods 130 on the new node 120 (e.g., image upgrade controller 150 schedules pod 130A on the new node 120D as illustrated in FIG. 3C). Image upgrade controller 150 then proceeds to step 418. At step 418, image upgrade controller 150 checks whether there are more old nodes to process. According to some embodiments, image upgrade controller 150 may determine whether there are more nodes 120 to process by checking upgrade store 170. If image upgrade controller 150 determines that there are more nodes

120 to process, then it proceeds back to step 404. If image upgrade controller 150 determines that there are no more nodes 120 to process, then it proceeds to step 402 and waits for a new trigger event.

Figure 5:
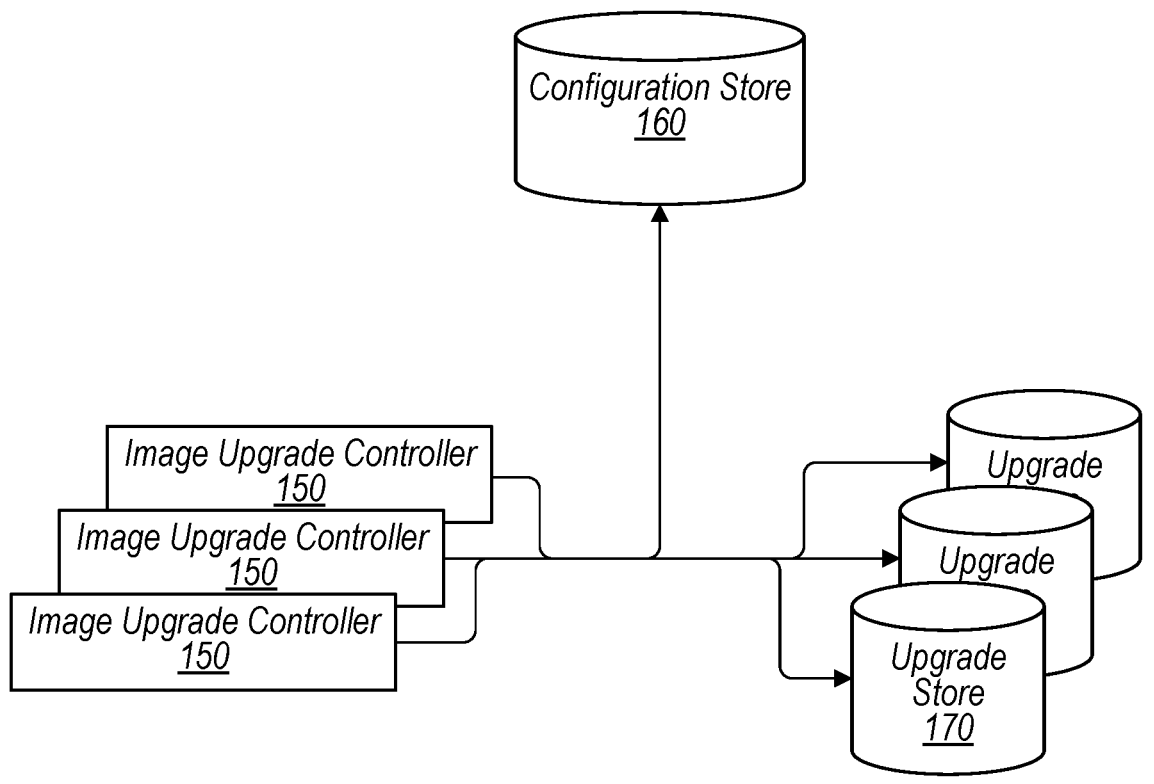
FIG. 5 is a block diagram illustrating example elements of a layout involving multiple image upgrade controllers, according to some embodiments.

Turning now to FIG. 5, a block diagram of an example architecture for enabling multiple node image upgrades at least partially in parallel is shown. In the illustrated embodiment, there are multiple image upgrade controllers 150, one configuration store 160, and multiple upgrade stores 170. The illustrated embodiment might be implemented differently than shown. As an example, there may be multiple configuration stores 160 or one upgrade store 170.

In various embodiments, an image upgrade controller 150 upgrades multiple nodes 120 at least partially in parallel. In some embodiments, that image upgrade controller 150 creates a group of similar nodes 120 based on particular selection criteria. That selection criteria may include the service provided by pods 130 running on a node 120, the cloud zone in which that node 120 resides, etc. In various embodiments, an image upgrade controller 150 sequentially upgrades different groups but upgrades the nodes 120 of the same group in parallel. That image upgrade controller 150 may synchronize data of multiple nodes 120 at relatively the same time by utilizing multi-threaded architecture. This may considerably bring down the total runtime as the time needed for the upgrade is less compared to an approach in which a single node 120 is upgraded at a time.

In order to upgrade multiple groups or clusters of nodes 120 at least partially in parallel, in various embodiments, multiple image upgrade controller 150 are used. Each image upgrade controller 150 may upgrade a respective group of nodes 120 and utilize its own upgrade store 170 to maintain information (e.g., a node mapping 200) about its node upgrades. Those image upgrade controllers 150 may communicate with a single configuration store 160, and an update to the node image 165 at that configuration store 160 may be used as trigger event for all those image upgrade controllers 150. In some embodiments, an image upgrade controller 150 is used per cloud zone and is responsible for upgrading the node 120 in its cloud zone. A cloud zone, in various embodiments, is a logical or physical grouping of components in a region. In many cases, the components of a cloud zone are isolated from the failures of components in other cloud zones. For example, a first cloud zone may be a first data center in a certain region and a second cloud zone may be a second data center in that region. Cloud zones may be isolated such that a failure at the data center of the first cloud zone does not affect the data center of the second cloud zone. In some cases, cloud zones might be the same data center, but correspond to components on separate networks such that one cloud zone may not be affected by the other cloud zone.

Figure 6:
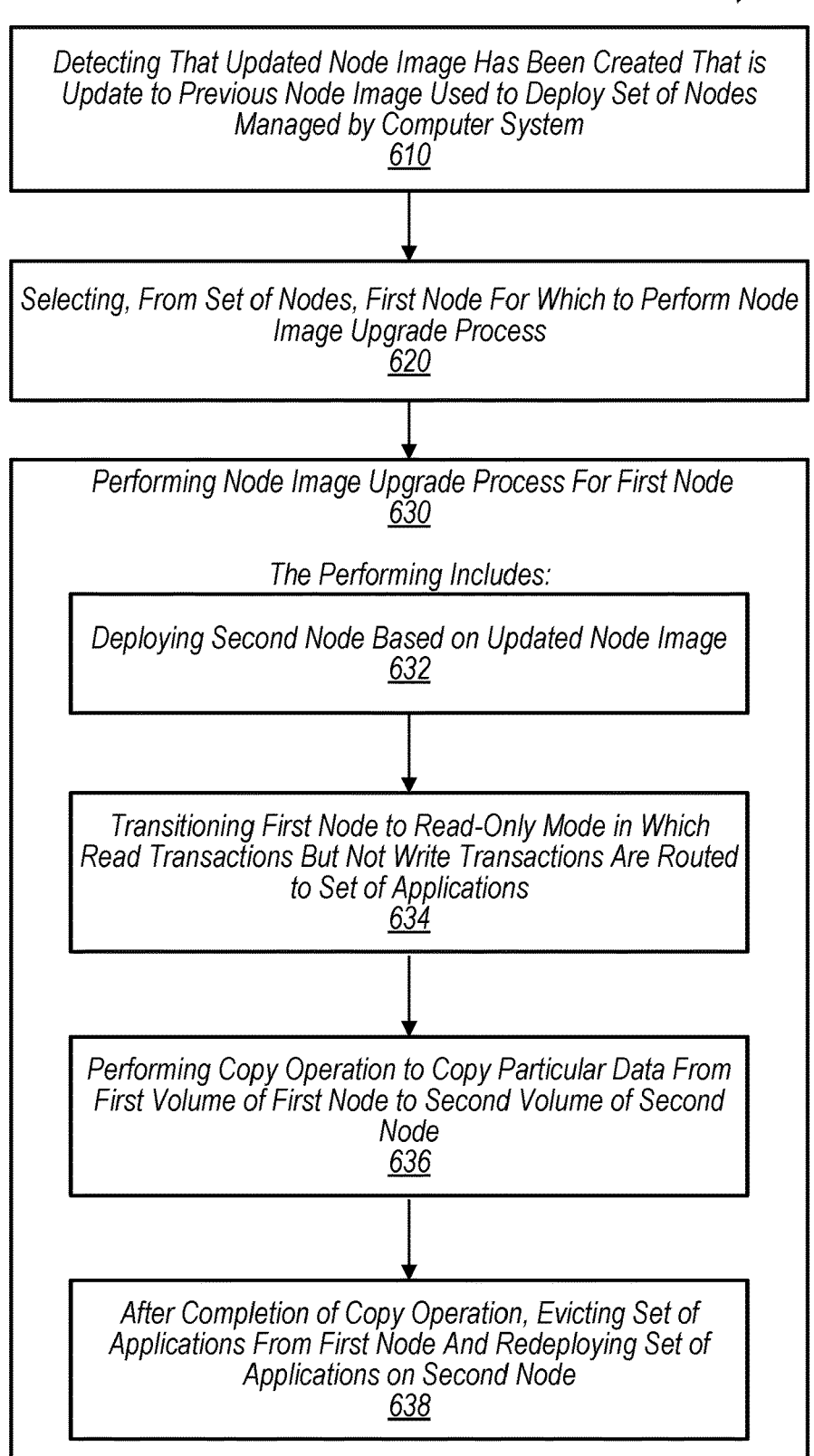
FIG. 6 is a flow diagram illustrating example method relating to performing an upgrade process for a set of nodes, according to some embodiments.

Turning now to FIG. 6, a flow diagram of a method 600 is shown. Method 600 is one embodiment of a method performed by a computer system (e.g., image upgrade controller 150) to upgrade a set of nodes (e.g., nodes 120A-C) from an old node image (e.g., node image 165 (V1)) to a new node image version (e.g., node image 165 (V2)). Method 600 may be performed by executing program instructions stored in a non-transitory computer-readable medium. In some embodiments, method 600 includes more or less steps than shown. For example, method 600 may include an additional step in which the computer system stores information indicating the status of a particular node's upgrade process.

Method 600 begins in step 610 with the computer system detecting that an updated node image has been created that is an update to a previous node image used to deploy a set of nodes managed by the computer system. In some embodiments, the computer system receives an indication of the updated node image in response to polling a node configuration store (e.g., configuration store 160) for node image information that identifies a current node image to be used to deploy nodes to an environment (e.g., target environment 110) that includes the set of nodes.

In step 620, the computer system selects, from a set of nodes, a first node for which to perform a node image upgrade process. The first node can include a first volume (e.g., a storage 140) that is used to store data of a set of applications (e.g., applications 135) that are executing on the first node. The selection of the first node from the set of nodes may be performed based on a selection scheme (e.g., round robin, by application workload, etc.).

In step 630, the computer system performs the node image upgrade process for the first node. In some embodiments, the computer system selects, from the set of nodes, another node for which to perform the node image upgrade process and performs the node image upgrade process for the other node at least partially in parallel with the performing of the node image upgrade process for the first node. In various embodiments, the computer system groups the set of nodes into a plurality of groups based on a service provided by a node and an availability zone in which the node resides. The other node may be selected based on that node belonging to the same group as the first node.

In step 632, the computer system deploys a second node based on the updated node image. In various embodiments, after deploying the second node based on the updated node image, computer system maintains a mapping (e.g., node mapping 200, which may be a hash map) between a network address (e.g., a private DNS address 210) of the first node and a network address (e.g., a private DNS address 210) of the second node and a status of the copy operation (e.g., a state 220). The mapping may enable the performance of a copy operation between the first node and the second node. The computer system may maintain information that identifies the number of attempts of the copy operation.

In step 634, the computer system transitions the first node to read-only mode in which read transactions but not write transactions are routed to the set of applications executing on the first node. In various embodiments, the computer system routes the write transactions to other nodes in the group that includes the first node—the group may be a primary cluster. In step 636, the computer system performs a copy operation to copy particular data from the first volume of the first node to a second volume of the second node (e.g., storage 140 (empty)). In some embodiments, the computer system spawns a thread on the second node that is operable to issue requests to the first node for the particular data of the first volume and store the particular data returned by the first node in the second volume.

In step 638, the computer system, after completion of copy operation, evicts the set of applications from the first node and redeploys the set of applications on the second node. The computer system may detect that the copy operation has failed based on the status of the copy operation and may reattempt the copy operation in response to a number of failures of the copy operation not satisfying a failure threshold (e.g., three failures). In various embodiments, the computer system, prior to evicting the set of applications, routes read traffic that is associated with the first node to the first node, and after evicting the set of applications from the first node, the computer system routes the read traffic to the second node instead of the first node. The computer system may cause a deployment service (which may be used in the deploying of the second node based on the updated node image) to remove the first node from the environment that includes the set of nodes. After completion of the copy operation, the computer system may also perform a verification check that includes comparing a first set of hash values derived from the particular data stored in the first volume with a second set of hash values derived from corresponding data stored in the second volume.

Exemplary Computer System

Figure 7:
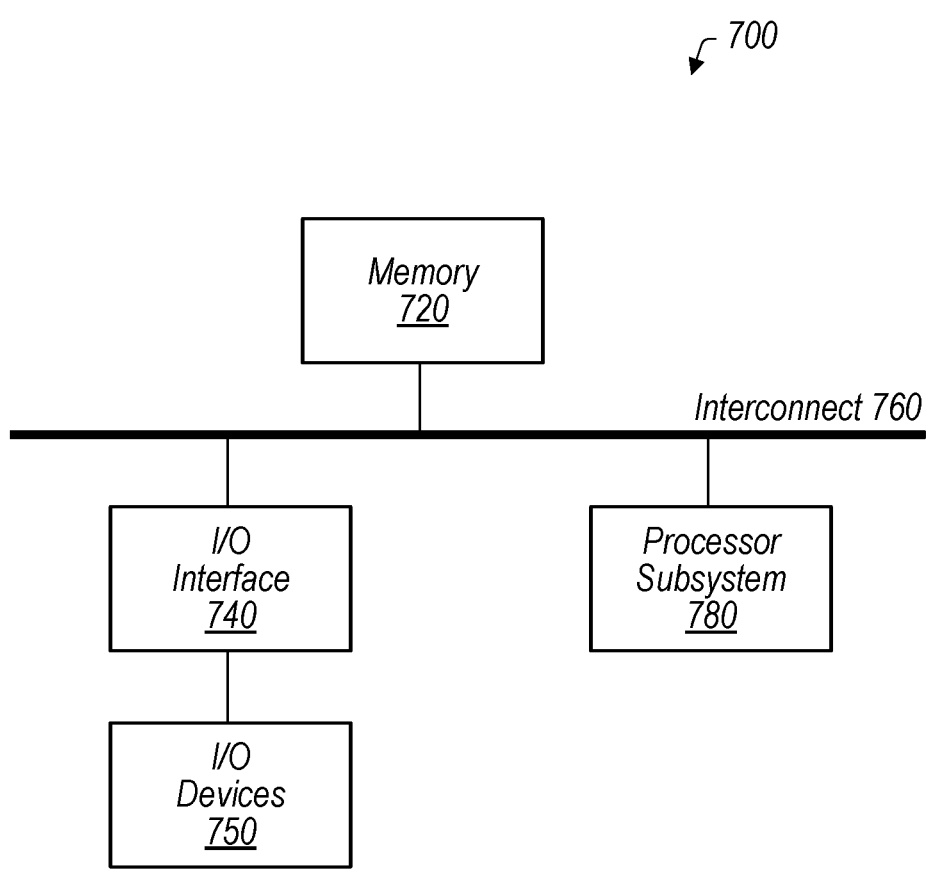
FIG. 7 is a block diagram illustrating elements of a computer system for implementing various systems described in the present disclosure, according to some embodiments.

Turning now to FIG. 7, a block diagram of an exemplary computer system 700, which may implement system 100, target environment 110, nodes 120, image upgrade controller 150, configuration store 160, and/or upgrade store 170 is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement pods 130, image upgrade controller 150, configuration store 160, and upgrade store 170 may be included/ stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   detecting, by a computer system, that there is an updated node image that is an updated version to a previous node image used to deploy a set of virtual machines;
   selecting, by the computer system and from the set of virtual machines, a first virtual machine for which to perform a node image upgrade process, wherein the first virtual machine uses a first volume to store data of a set of applications executing on the first virtual machine; and
   performing, by the computer system, the node image upgrade process for the first virtual machine, wherein the performing includes:
      deploying a second virtual machine based on the updated node image, wherein the first virtual machine was deployed based on the previous node image;
      maintaining a set of mappings that maps the set of applications to the first virtual machine and the first virtual machine to the second virtual machine;
      after the deploying of the second virtual machine, transitioning the set of applications to a read-only mode in which the set of applications is permitted to process read transactions but not write transactions;
      after the transitioning, performing, based on the set of mappings, a copy operation to copy the data of the set of applications from the first volume used by the first virtual machine to a second volume used by the second virtual machine; and
      after completion of the copy operation:
         scaling down the first virtual machine; and
         after the scaling down of the first virtual machine, redeploying, based on the set of mappings, the set of applications on the second virtual machine.

2. The method of claim 1, wherein the set of mappings includes a mapping between a network address of the first virtual machine and a network address of the second virtual machine, and wherein the performing of the node image upgrade process for the first virtual machine includes:
   the computer system maintaining, for the node image upgrade process of the first virtual machine, a status of the copy operation.

3. The method of claim 2, further comprising:
   detecting, by the computer system, that the copy operation has failed based on the status of the copy operation; and
   reattempting, by the computer system, the copy operation in response to a number of failures of the copy operation not satisfying a failure threshold.

4. The method of claim 1, wherein the detecting includes the computer system receiving an indication of the updated node image in response to polling a node configuration store that stores information about the set of virtual machines, including the updated node image.

5. The method of claim 1, further comprising:
   prior to the redeploying of the set of applications, the computer system routing read traffic that is associated with the first virtual machine to the first virtual machine; and
   after the redeploying of the set of applications, the computer system routing the read traffic to the second virtual machine.

6. The method of claim 1, wherein the performing of the copy operation includes:
   spawning a thread on the second virtual machine that is operable to issue requests to the first virtual machine for the data of the set of applications and store the data returned by the first virtual machine in the second volume.

7. The method of claim 1, further comprising:
   selecting, by the computer system and from the set of virtual machines, a third virtual machine for which to perform the node image upgrade process; and
   performing, by the computer system, the node image upgrade process for the third virtual machine at least partially in parallel with the performing of the node image upgrade process for the first virtual machine.

8. The method of claim 7, further comprising:

grouping, by the computer system, the set of virtual machines into a plurality of groups based on a service provided by a given virtual machine and an availability zone in which the given virtual machine resides, wherein the third virtual machine is selected based on the third virtual machine belonging to a same one of the plurality of groups as the first virtual machine.

9. The method of claim 1, wherein the first virtual machine is part of a group of virtual machines that implement a primary cluster, wherein other virtual machines in the group execute instances of the set of applications, and wherein the method further comprises:

routing, by the computer system, the write transactions to the other virtual machines in the group.

10. The method of claim 1, wherein the performing of the node image upgrade process for the first virtual machine includes:

after completion of the copy operation, the computer system performing a verification check that includes comparing a first set of hash values derived from the data stored in the first volume with a second set of hash values derived from corresponding data stored in the second volume.

11. A non-transitory computer readable medium having program instructions stored thereon that are executable by a computer system to cause the computer system to perform operations comprising:

detecting that there is an updated node image that is an updated version to a previous node image used to deploy a set of virtual machines;

selecting, from the set of virtual machines, a first virtual machine for which to perform a node image upgrade process, wherein the first virtual machine uses a first volume to store data of a set of applications executing on the first virtual machine; and performing the node image upgrade process for the first virtual machine, wherein the performing includes:

deploying a second virtual machine based on the updated node image, wherein the first virtual machine was deployed based on the previous node image;

maintaining a set of mappings that maps the set of applications to the first virtual machine and the first virtual machine to the second virtual machine;

after the deploying of the second virtual machine, transitioning the first virtual machine to a read-only mode in which read transactions but not write transactions are routed to the set of applications;

after the transitioning, performing, based on the set of mappings, a copy operation to copy the data of the set of applications from the first volume used by the first virtual machine to a second volume used by the second virtual machine; and after completion of the copy operation:

scaling down the first virtual machine; and after the scaling down of the first virtual machine, redeploying, based on the set of mappings, the set of applications on the second virtual machine.

12. The non-transitory computer readable medium of claim 11, wherein the set of mappings includes a mapping between a private Domain Name System (DNS) address of the first virtual machine and private DNS address of the second virtual machine.

13. The non-transitory computer readable medium of claim 11, wherein the detecting includes:

polling a node configuration store for node image information that identifies a current node image to be used to deploy virtual machines to an environment that includes the set of virtual machines; and receiving, from the node configuration store, node image information that identifies the updated node image.

14. The non-transitory computer readable medium of claim 11, wherein the operations further comprise:

grouping the set of virtual machines into a plurality of groups based on a service that is provided by a given virtual machine;

selecting, from a particular one of the plurality of groups that includes the first virtual machine, a third virtual machine for which to perform the node image upgrade process; and performing the node image upgrade process for the third virtual machine at least partially in parallel with the performing of the node image upgrade process for the first virtual machine.

15. The non-transitory computer readable medium of claim 11, wherein the operations further comprise:

maintaining status information identifying a status of the copy operation and a number of attempts of the copy operation;

detecting that the copy operation has failed based on the status; and based on the number of attempts of the copy operation not satisfying a failure threshold, reattempting the copy operation.

16. A system, comprising:

at least one processor; and memory having program instructions stored thereon that are executable by the at least one processor to cause the system to perform operations comprising:

detecting that there is an updated node image that is an updated version to a previous node image used to deploy a set of virtual machines;

selecting, from the set of virtual machines, a first virtual machine for which to perform a node image upgrade process, wherein the first virtual machine uses a first volume to store data of a set of applications executing on the first virtual machine; and performing the node image upgrade process for the first virtual machine, wherein the performing includes:

deploying a second virtual machine based on the updated node image, wherein the first virtual machine was deployed based on the previous node image;

maintaining a set of mappings that maps the set of applications to the first virtual machine and the first virtual machine to the second virtual machine;

after the deploying of the second virtual machine, transitioning the first virtual machine to a read-only mode in which read transactions but not write transactions are routed to the set of applications;

after the transitioning, performing a copy operation to copy the data of the set of applications from the first volume used by the first virtual machine to a second volume used by the second virtual machine; and after completion of the copy operation:

scaling down the first virtual machine; and after the scaling down of the first virtual machine, redeploying, based on the set of mappings, the set of applications on the second virtual machine.

17. The system of claim 16, wherein the set of mappings includes a hash map between the first virtual machine and the second virtual machine.

18. The system of claim 16, wherein the operations further comprise grouping the set of virtual machines into a plurality of groups based on an availability zone in which a given virtual machine resides;

selecting, from a particular one of the plurality of groups that includes the first virtual machine, a third virtual machine for which to perform the node image upgrade process; and performing the node image upgrade process for the third virtual machine at least partially in parallel with the performing of the node image upgrade process for the first virtual machine.

19. The system of claim 16, wherein the operations further comprise:

maintaining status information identifying a status of the copy operation and a number of attempts of the copy operation;

detecting that the copy operation has failed based on the status; and based on the number of attempts of the copy operation not satisfying a failure threshold, reattempting the copy operation.

\* \* \* \* \*